United States Patent
Hund

(10) Patent No.: US 10,087,976 B2
(45) Date of Patent: Oct. 2, 2018

(54) MACHINE ELEMENT

(71) Applicant: Spieth-Maschinenelemente GmbH & Co. KG, Esslingen (DE)

(72) Inventor: Alexander Hund, Aichwald (DE)

(73) Assignee: SPIETH-MASCHINENELEMENTE GMBH & CO. KG, Esslingen (DE)

( * ) Notice: Subject to any disclaimer, the term of this patent is extended or adjusted under 35 U.S.C. 154(b) by 64 days.

(21) Appl. No.: 15/105,006

(22) PCT Filed: Feb. 6, 2015

(86) PCT No.: PCT/EP2015/000242
§ 371 (c)(1),
(2) Date: Jun. 16, 2016

(87) PCT Pub. No.: WO2015/120967
PCT Pub. Date: Aug. 20, 2015

(65) Prior Publication Data
US 2016/0312818 A1    Oct. 27, 2016

(30) Foreign Application Priority Data

Feb. 11, 2014 (DE) .................. 10 2014 002 192

(51) Int. Cl.
| F16B 39/00 | (2006.01) |
| F16B 33/06 | (2006.01) |
| F16B 39/02 | (2006.01) |

(52) U.S. Cl.
CPC ............ *F16B 39/028* (2013.01); *F16B 33/06* (2013.01)

(58) Field of Classification Search
CPC .................. F16B 39/028; F16B 33/06

USPC .................. 411/286, 288, 290, 291
See application file for complete search history.

(56) References Cited

U.S. PATENT DOCUMENTS

| 4,557,652 A | 12/1985 | Lundgren | |
| 4,571,112 A * | 2/1986 | Johnson | B02C 1/00 173/131 |
| 5,385,360 A * | 1/1995 | Shook | B62K 21/06 280/279 |

(Continued)

FOREIGN PATENT DOCUMENTS

| CH | 525 980 | 7/1972 |
| DE | 10 2004 003 183 | 9/2005 |

(Continued)

OTHER PUBLICATIONS

International Search Report (ISR) dated May 13, 2015 in International (PCT) Application No. PCT/EP2015/000242.

*Primary Examiner* — Flemming Saether
(74) *Attorney, Agent, or Firm* — Wenderoth, Lind & Ponack, L.L.P.

(57) ABSTRACT

A machine element has individual ring components (10, 12) fixable to third components such as axles, hubs or shafts by internal and/or external threads. One ring component (10) can be moved in an axial direction relative to another ring component (12), by clamping screws (18). The two ring components (10, 12) are independent components that delimit a separation space (22) with their adjacent mutually facing end-faces. The separation space opens on all sides to the surroundings. Only the clamping screws (18) of the adjusting device pass through the separation space (22).

15 Claims, 2 Drawing Sheets

(56) References Cited

U.S. PATENT DOCUMENTS

| | | | | |
|---|---|---|---|---|
| 5,472,245 A | * | 12/1995 | Meske | D02H 13/32 |
| | | | | 242/118.5 |
| 5,907,983 A | | 6/1999 | Spirer | |
| 5,915,902 A | * | 6/1999 | Patterson | F16B 39/286 |
| | | | | 411/277 |
| 2016/0327084 A1 | * | 11/2016 | Hund | F16B 39/028 |

FOREIGN PATENT DOCUMENTS

| | | |
|---|---|---|
| GB | 510144 | 7/1939 |
| GB | 2 134 615 | 8/1984 |
| GB | 2 144 819 | 3/1985 |

* cited by examiner

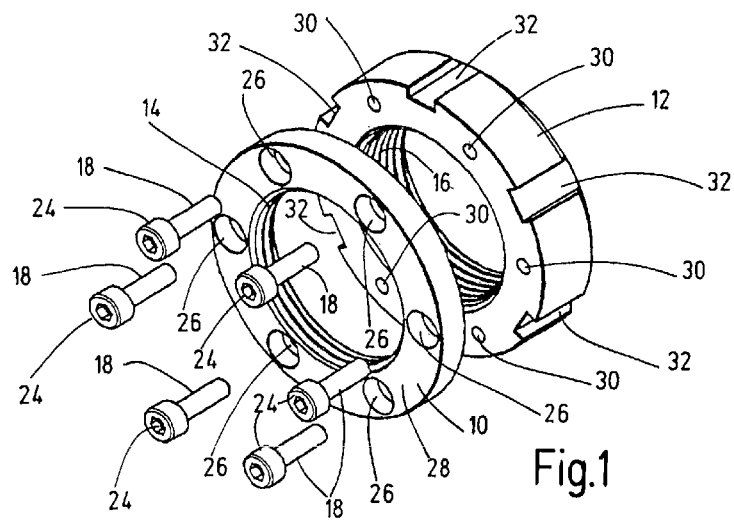
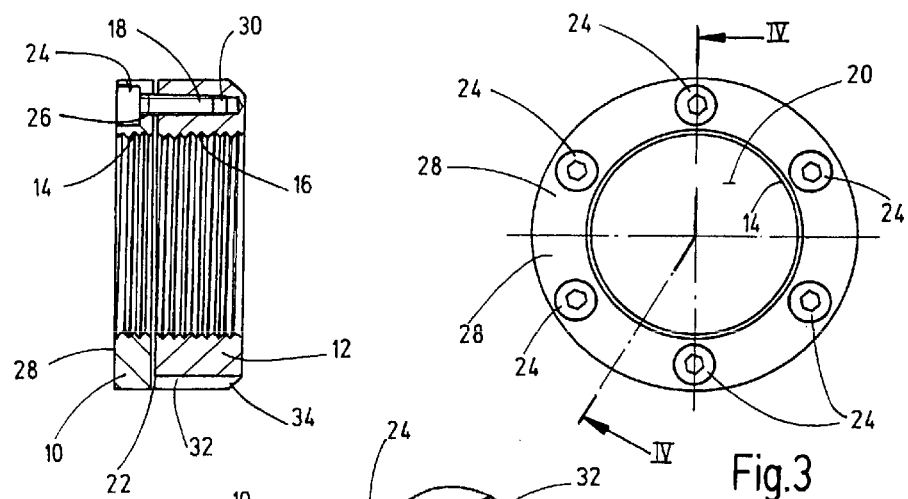
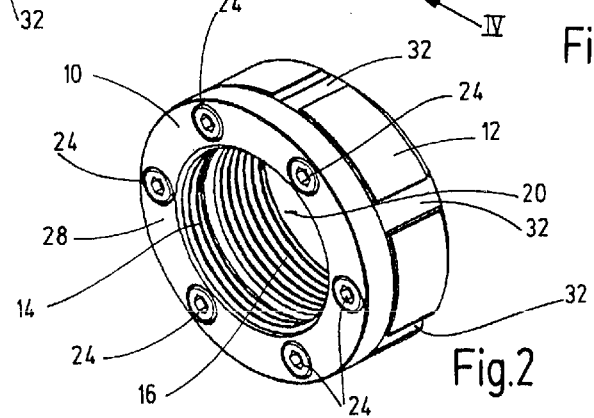

MACHINE ELEMENT

FIELD OF THE INVENTION

The invention concerns a machine element, in particular in form of an adjusting nut, comprising individual ring components. The ring components can be fixed to third components, such as axles, hubs or shafts, by internal and/or external threads. At least one ring component can be moved, viewed in an axial direction, towards at least another component by an adjusting device with several clamping screws in an advancing movement from an assembled state into a locking position and vice versa. The other ring components are provided as discrete components and delimit a separation space with their adjacent and facing end-faces. The separation space opens on all sides to the surrounding space.

BACKGROUND OF THE INVENTION

Machine elements of this kind can be used for many different applications. If the machine element is used as a locking device, friction-locking shaft/hub connections can be achieved due to the ring component design with adjusting device. In applications such as this, care is taken that the geometry of the individual ring-shaped components forms a symmetrical unit that is as close as possible to perfect. When the ring components are axially compressed by the adjusting device, a uniform transverse contraction in the direction of shaft and hub results. This contraction permits achieving a centering effect that is rated at the level of the hydro-expansion principle. To enable a high level of force transmission via the adjusting device, steel materials are essentially used for the individual ring components.

A further application as machine element concerns guide sleeves that serve as circular, linear guide elements in the manufacture of machines and jigs. The application of such guide sleeves is appropriate in instances where the advantages of a slideway, for example a high degree of absorption, are to be utilized and where at the same time a minimal amount of guide play is specified. Guide sleeves are therefore used particularly on guide racks, on circular carriage guides as well as on tailstock center sleeves. In addition to the discussed linear movement, simultaneous rotating movements are also possible. However, for lubricating reasons, a rotating movement cannot be achieved only in the sense of a friction-type bearing. To adjust an optimal joint clearance for every operating situation on the guide sleeves, soft materials may be used such as, for example, bronze materials.

Since hydraulically lubricated, adjustable multi-lobe radial friction bearings, which are mainly used in machine design, also have ring components that may be tensioned with respect to each other by an adjusting device, the basic solutions developed for locking devices and guide sleeves can also be transferred to such radial friction bearing applications.

However, particularly preferred in this instance are adjusting nut solutions or ring nuts, which may be specified with extreme accuracy and uniform locking forces in relation to their thread flanks for spindle threads and such like as third components.

One representative of such an adjusting nut as a machine element is described in DE 25 44 498 C3. This known solution describes a ring nut in the sense of an adjusting nut. Although formed as a single piece, the adjusting nut is subdivided into ring components by a first annular groove that originates from the external circumference surface and a second annular groove that is offset from the first annular groove and extends from the internal circumference surface. One of the ring components serves as a counter-ring, between which is disposed a substantially smaller intermediate ring that bridges the annular grooves. The intermediate ring is connected with its inner circumference to one of the rings and with its external circumference to the other one of these rings. The counter-ring and the intermediate ring have a common thread at their connection point. The ring nut may be locked by several, individually adjustable screws that extend parallel to the axis of the ring nut. The screws are disposed evenly distributed around a median circumference. The screws are screwed into the counter-ring, creating a gap to the intermediate ring, and bracing them against the adjusting ring. This known machine element solution therefore uses three ring components that are permanently connected to each other in series via membrane parts with thin wall sections. Several adjusting bolts or stud bolts that are distributed evenly around the outer circumference of the ring nut serve as adjustment devices.

In a comparable, known solution, as described in DE 10 2004 003 183 A1, an annular groove that extends from the inner circumference surface is provided for the subdivision into a ring component that acts as adjusting ring and into a ring component that acts as counter-ring. Both are provided with the same internal thread, in which again a connection via a membrane component in form of a thin wall section is provided. As before, several adjusting bolts distributed evenly around the outer circumference serve as the adjusting device.

The manufacturing process of such single-piece solutions with membrane components is relatively elaborate since the materials that are suitable, such as stainless steel or titanium, are difficult to machine, which is not conducive to an economical production of the membrane components.

In order to avoid the disadvantages in connection with the single-piece solutions, the document DE 199 12 068 B4 describes a machine element of the two-part kind as stated at the outset. Since in this instance the ring components that form the locking ring and the adjusting ring are produced as discrete components, the manufacture of a soft membrane is no longer necessary, which alleviates the associated production problems and limitations regarding choice of materials. Nevertheless, a significant disadvantage lies in the large number of individual components that are included in this known solution as functional components.

Although the clamping screws of the adjusting device are omitted in this solution, the ring component that acts as adjusting ring and the ring component that acts as locking ring are coupled together in such a way that they form a positively locked unit. The ring components then remain locked to each other in terms of orientation and pitch of the threads. To achieve this, connecting bolts are provided that pass through the ring component that acts as locking ring. The bolt shafts are pressed into blind holes in the component that acts as adjusting ring. Their bolt heads limit the relative axial movements between the ring components to a maximum distance. Added to the increased number of components is the production cost required to make the press fits for the bolts.

A further disadvantage is that an increased number of bore holes must be machined into the ring component that forms the locking ring. To limit weakening of the structure, the known solution has, in addition to the three bore holes for the connecting bolts, only three bore holes for a clamping screw each. This arrangement leads to an unfavorable distribution of the clamping force. Despite limiting the clamping screws to a lower number, the structural rigidity of the component that acts as locking ring is compromised. As shown in that document of the known solution, three further threaded bore holes are provided for each adjusting screw that serve as an assembly aid, which arrangement of bore holes increases the number through holes to nine. The production effort for the known solution is additionally increased by coil springs, which retain the ring components, coupled by the connecting bolts, frictionally locked at an axial maximum distance.

SUMMARY OF THE INVENTION

An object of the invention to provide a machine element of the kind described characterized by a simple design that is economical to produce.

According to the invention, this object is basically met by a machine element having, as a significant feature, only the clamping screws of the adjusting device pass through the gap between the ring components. All possible adjustment positions of the respective annular bodies relative to each other between the assembled state and the locking position are achieved by the clamping screws. The production process is on the one hand simplified in that only the two ring components and the clamping screws are required as individual parts. Furthermore, the machining of a press fit for the connecting bolts that couple the ring components can also be omitted, as well as the costs for further parts such as the spring arrangements or the adjusting screws. Since in the invention both ring components can be freely handled and/or replaced without positive locking by the connecting bolts, the invention enables the creation of a modular system in which, depending on the requirements in the respective application, the adjusting ring and the locking ring may be chosen freely concerning material and dimension. Because of the separation between the adjusting ring and the locking ring, their functional areas such as threads and/or planar contact surfaces, for example, may be coated differently depending on their function. Thus, a coating with a high friction coefficient on the thread of the locking ring may be provided for a better locking effect, and a coating with a lower friction coefficient may be provided on the thread and on the contact face of the adjusting ring to avoid stick-slip effects and for the better transfer of the tensioning moment of the clamping screws into axial pre-load force.

The annular bodies used in the solution according to the invention are preferably machined evenly round and form a circular, closed item. Each annular body is made in form of a hollow cylinder, but it may also be designed as a solid, closed body, in particular if the annular body is to be inserted, in particular screwed, with an external thread into a corresponding internal thread of hollow-cylindrical third components. Moreover, the external contour of the annular body may, instead of the even, round annular surface, be a polygon, and may in particular be designed with an irregular outer contour to provide a contact surface for fastening tools and handling systems.

The clamping screws of the adjusting device that engage on a coaxial reference circle evenly with the individual annular bodies, and which extend axially parallel through the preferably gap-shaped space may, since no further through holes are required, be disposed in greater numbers. For example six clamping screws may be provided without a significant reduction in structural rigidity.

Advantageously, the heads of the clamping screws may, in the locked, assembled state be fully integrated inside the respective ring component so that the clamping screws do not enlarge the axial dimension of the machine element.

In advantageous exemplary embodiments the respective annular bodies have a central opening that is provided with an internal thread. In this embodiment the machine element forms an adjusting nut for a component with an external thread.

Each of the annular bodies, which are arranged concentrically to each other, has preferably the same internal and external diameter, where the internal thread is the same in each annular body.

Advantageously, at least two annular bodies are fastened with the adjusting device as an assembly set on the third component in such a way that, after positioning the machine element on the third component, the annular body that serves as adjusting ring is locked solely by the clamping screws of the adjusting device with respect to the further annular body that serves as locking ring.

The axial width of the gap-shaped distance between the annular bodies is preferably equal to a low number of thread turns of the internal thread of the annular bodies, preferably only one thread turn or a part of the same.

In order to simply and securely position the machine element, the annular body that serves as adjusting ring may on the external circumference be provided with at least one contact point to provide grip for a fastening tool.

When clamping the adjacent annular bodies by the clamping screws of the adjusting device in the machine element made according to the invention, the thread flank clearance between the internal threads of the annular bodies and the respective applicable thread section of at least one external thread of the third component is taken up in the opposite direction. The machine element then forms a position-locked adjusting nut.

Since the ring components come as separate items, an additional advantage of the invention lies in the fact that they may be packaged as a kit that comprises locking ring, adjusting ring and clamping screws. The customer then has to assemble the kit. This consumer assembly means that the manufacturer saves on assembly costs. Moreover, placing or vulcanizing a plastic ring between the ring components to seal the gap is possible. This placing or vulcanizing is of advantage, for example, in the food industry to avoid pockets of dirt. A spring action can be achieved at the same time between the components by the plastic ring.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 a perspective and exploded view of a machine element according to an exemplary embodiment of the invention;

FIG. 2 a perspective view of the machine element of FIG. 1 in the assembled state;

FIG. 3 a plan view of the assembled machine element FIG. 2;

FIG. 4 a side view in section of the assembled machine element taken along line IV-IV in FIG. 3.

DETAILED DESCRIPTION OF THE INVENTION

Figure 5:
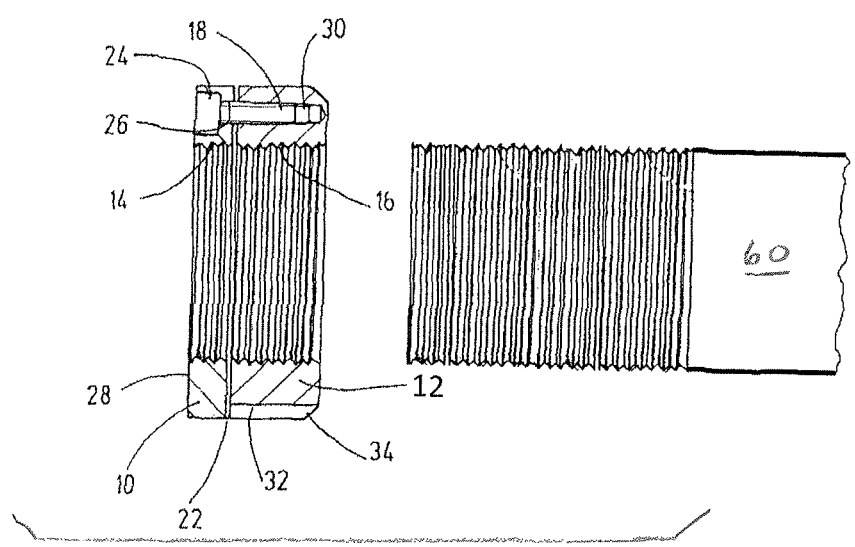
FIG. 5 a side view in section of the machine element of FIG. 1 with conventional shafts to be connected by the machine element.

The exemplary embodiment of the machine element according to the invention as depicted in the figures, which in engineering terms is called an adjusting nut or ring nut, comprises two ring components 10, 12 of the kind that may be attached to third components 60, for example to axles, shafts or hubs. To this end the two ring components 10, 12 are provided at their internal circumferences with two continuous threaded sections 14, 16. Threaded sections 14, 16 can be joined with the corresponding threaded sections of third components (not shown) in the usual manner by screwing them on. At least the one or first ring component 10 can be moved towards the further or second ring component 12 in axial direction in an advancing movement by the adjusting device. In this manner, the different engaged thread sections 14, 16 are reciprocally clamped without play so as to lock the adjusting nut securely in position on the third component (not shown). The adjusting device is formed by the clamping screws 18.

The ring components 10, 12 take the form of circular-cylindrical annular bodies, in which the axial extension of the ring component 12 that serves as adjusting ring is greater than the axial extension of the ring component 10 that serves as locking ring. The ring components 10, 12 surround with their threaded sections 14, 16 a central opening 20 (FIGS. 2 and 3). As shown in FIGS. 1 to 3, the adjusting device comprises a total of six clamping screws 18 which, in the assembled state, pass axially parallel through a space in form of a gap 22 between the ring components 10, 12. The clamping screws 18 are disposed evenly distributed on a reference circle that is concentric to the axis of the ring components 10, 12. Screws 18 preferably do not protrude from the underside of the component 12, which faces away from the two adjacent front faces of the components 10, 12, in any screw position or any adjustment position respectively of the two ring components 10, 12.

The clamping screws 18 in the present example are designed as socket head screws with their heads 24 recessed into radially expanded end sections of through holes 26 of the ring component 10. The heads 24 are then essentially flush with the outer end face 28 of the ring component 10 in the assembled state, as well as in the locking position. The end face 28 is a flat surface located in a radial plane, as is the case with the other end face of the ring component 10 and also the two end faces of the other ring component 12, although these end faces have no reference numbers in the figures. The six clamping screws 18, which are distributed rotationally symmetrically, may be screwed into the associated threaded blind bore holes 30 in the ring component 12 that serves as adjusting ring. To provide grip for a tool to adjust the position on a not depicted shaft or axle, longitudinal recesses 32 are formed into the ring component 12 that serves as adjusting ring. The ring component 12, which serves as adjusting ring, is provided with a beveled edge 34 (FIG. 4) on the flat end face that faces away from the other ring component 10.

In the assembled state, as shown in FIGS. 2 and 4, the clamping screws 18 are screwed so far into the threaded bore holes 30, that the width of the gap 22 that forms the space in between is only a few thread turns wide, preferably only one tread turn or a part of a thread turn of the threaded sections 14, 16 of the ring components 10, 12. When the ring components 10, 12 are screwed on and correctly positioned on the axle or shaft, that is, when the ring component 12 that serves as adjusting ring is in the desired locking position, the adjusting nut is transferred from the assembled state into the locked state by tightening the clamping screws 18. Thus the adjacently located ring components 10, 12 are clamped so that the thread flank clearance between the internal thread sections 14, 16 of the ring components 10, 12 and the associated thread section of the respective external thread of the (not depicted) third component is taken up and the adjusting nut is thus securely locked into position.

Since the invention provides for the ring components 10, 12 to be produced as separate, discrete components, their individual functional sections, for example the threaded sections 14, 16 and/or their flat surfaces, may be coated differently depending on their function. Thus it is possible, for example, to apply a coating with a high friction coefficient to the threaded section 14 of the ring component 10 that serves as locking ring to provide a better locking action. In the same way, a coating can be chosen with a lower friction coefficient on the threaded section 16 and/or on the flat end faces of the ring components 10, 12 to avoid stick-slip effects, and for a better conversion of the fastening torque of the clamping screws 18 into an axial pre-load force. The ring components 10, 12, which are completely separated from each other, exhibit in at least their installed state along their facing end-faces a predeterminable, axial distance from each other that then remains essentially the same. Thus, all end faces of both annular bodies 10, 12 are in every installation orientation disposed essentially parallel to each other. There are no connecting sections between the two annular bodies 10, 12 such as membranes or connecting bridges. Moreover, the outer circumference of the respective annular body 10, 12 is closed and has no slots or other contact points apart from the longitudinal grooves 32 to aid the grip of a tool on ring 12.

The ring components 10, 12 of the invention are controlled exclusively by the clamping screws 18 of the adjusting device. Since there is a separation space between the adjacent end faces of the ring components 10, 12 in form of a media-permeable gap 22, this may be sealed by placing in between or vulcanizing in an additional plastic ring (not shown), which may be of advantage, for example, in the food industry for avoiding so-called dirt pockets. At the same time, a spring effect can be achieved or cushioning effect through the plastic ring, which influences the adjustment of the two ring components 10, 12 to each other through the clamping screws 18. The individual ring components 10, 12 may each also have an external thread instead of an internal thread, resulting in a two-part locking screw (not shown) in the usual manner. Moreover, different internal and external diameters may be chosen for the respective ring component 10, 12 depending on the third component that is to be accommodated in the section of the internal, central opening 20 of ring component 10 and ring component 12 respectively.

With the machine element solution according to the invention, a modular system, in which modular system, for example, differently-formed ring components 12 can be combined as load component of the locking or adjusting nut with only one type of ring component 10 as locking component. In omitting the membrane system as a connecting element between the ring components 10, 12, the entire adjusting nut as machine element may also be reduced in length accordingly. With the omission of a connecting element between the ring components 10, 12, the machine element may also be supplied to customers or interested parties as a packing unit with unassembled components, who then assemble the machine element as a whole and complete it on the third component. This arrangement saves the locking nut manufacturer the assembly costs.

If the internal thread sections 14, 16 of the ring components 10, 12 were omitted, it would result in plain, cylindrical internal surfaces that delimit the internal, central opening 20 radially outwards. With the same design according to the invention, this form creates, instead of an adjusting nut, a locking device or a guide sleeve and/or significant components of a bearing, for example in form of a radial friction bearing (not shown). Moreover, as indicated in the prior art, more than two ring components 10, 12 may be used depending on the application.

While one embodiment has been chosen to illustrate the invention, it will be understood by those skilled in the art that various changes and modifications can be made therein without departing from the scope of the invention as defined in the claims.

The invention claimed is:

1. A machine element, comprising:
   first and second ring components fixable to a third component by internal and external threads on said first and second ring components and on the third component, said first ring component being movable in an axial direction thereof towards said second ring component with said first and second ring components being separate and discrete components;
   an adjusting device including several clamping screws coupled to said first and second ring components and moving said first and second ring components toward one another between an assembled state and a locking state and all possible relative positions of said first and second ring components;
   a separation space delimited by facing end faces of said first and second ring components, said separation space being open on all lateral sides to a surrounding space of the machine element, said clamping screws of the machine element passing through said separation space; and
   first and second coatings on functional sections said first and second ring components, respectively, said first and second coatings being different dependent on functions thereof.

2. A machine element according to claim 1 wherein said first and second ring components and said clamping screws form an adjusting nut.

3. A machine element according to claim 1 wherein the third component includes an axle, shaft or hub.

4. A machine element according to claim 1 wherein said first and second ring components have internal threads.

5. A machine element according to claim 4 wherein thread clearances between said internal threads of said first and second ring components and a thread section of an external thread on the third component are reduced in opposite directions upon clamping of the first and second ring components by said clamping screws.

6. A machine element according to claim 1 wherein said functional sections comprise at least one of said threads or planar contact surfaces on said first and second ring components.

7. A machine element according to claim 1 wherein said functional sections comprise said threads on said first and second ring components.

8. A machine element according to claim 1 wherein said first coating on is on said threads of said first ring component and has a first friction coefficient such that said first ring component is a locking ring with a better locking effect; and
said second coating is on at least one of said threads or a planar contact surface of said second ring component such that said second ring component serves as an adjusting ring with a second friction coefficient, said second friction coefficient being lower than said first friction coefficient.

9. A machine element according to claim 8 wherein said second coating is on said threads on said second ring component.

10. A machine element according to claim 1 wherein said clamping screws are arranged along a circle coaxial with said first and second ring components.

11. A machine element according to claim 1 wherein said clamping screws have heads completely within recesses in one of said ring components in the locking state.

12. A machine element according to claim 1 wherein each of said first and second ring components is an annular body having a central opening with an internal thread.

13. A machine element according to claim 12 wherein each said annular element has equal internal and external diameters with the same internal thread.

14. A machine element according to claim 13 wherein said separation space has an axial dimension equal to or less than that only a few thread turns of the same internal thread.

15. A machine element according to claim 1 wherein said second ring component comprises a fastening tool grip on an outer circumference of said second ring component.

* * * * *